(12) United States Patent
Ramamurthi et al.

(10) Patent No.: US 9,030,961 B2
(45) Date of Patent: May 12, 2015

(54) METHOD AND SYSTEM FOR IMPLEMENTING LINK ADAPTATION BASED ON AN APPLICATION PROFILE

(75) Inventors: Vishwanath Ramamurthi, Davis, CA (US); Wei-Peng Chen, Fremont, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1128 days.

(21) Appl. No.: 12/661,421

(22) Filed: Mar. 15, 2010

(65) Prior Publication Data

US 2011/0222619 A1 Sep. 15, 2011

(51) Int. Cl.
H04L 5/12 (2006.01)
H04L 27/00 (2006.01)
H04L 12/825 (2013.01)
H04W 40/26 (2009.01)

(52) U.S. Cl.
CPC .......... *H04L 27/0008* (2013.01); *H04L 47/263* (2013.01); *H04W 40/26* (2013.01); *H04L 27/0012* (2013.01)

(58) Field of Classification Search
USPC .................................................. 370/253, 328
See application file for complete search history.

(56) References Cited

U.S. PATENT DOCUMENTS

| 6,999,432 B2 * | 2/2006 | Zhang et al. | 370/328 |
| 2009/0103450 A1 * | 4/2009 | Peisa et al. | 370/253 |

OTHER PUBLICATIONS

3GPP TS 23.203 V8.4.0 (Dec. 2008), Technical Specification, 3rd Generation Partnership Project; Technical Specification Group Services and System Aspects; Policy and Charging Control Architecture (Release 8), © 2008, *3GPP Organization Partners*.
3GPP TS 25.814 V7.1.0 (Sep. 2006), Technical Report, 3rd Generation Partnership Project; Technical Specification Group Radio Access Network; Physical Layer Aspects for Evolved Universal Terrestrial Radio Access (UTRA) (Release 7), © 2006, *3GPP Organization Partners*.
3GPP TS 36.211 V8.6.0 (Mar. 2009), Technical Specification, 3rd Generation Partnership Project; Technical Specification Group Radio Access Network; Evolved Universal Terrestrial Radio Access (E-UTRA); Physical Channels and Modulation (Release 8), © 2009, *3GPP Organization Partners*.
3GPP Ts 36.212 V8.6.0. (Mar. 2009), Technical Specification, 3rd Generation Partnership Project; Technical Specification Group Radio Access Network; Evolved Universal Terrestrial Radio Access (E-UTRA); Multiplexing and Channel Encoding (Release 8), © 2009, *3GPP Organization Partners*.
3GPP Ts 36.213 V8.6.0 (Mar. 2009), Technical Specification, 3rd Generation Partnership Project; Technical Specification Group Radio Access Network; Evolved Universal Terrestrial Radio Access (E-UTRA); Physical Layer Procedures (Release 8), © 2009, *3GPP Organization Partners*.
WiMAX™ System Evaluation Methodology, Version 2.1, Jul. 7, 2008 *WiMAX Forum*, © 2007-2008 WiMAX Forum.
Ramamurthi et al., *Method and System for Implementing Link Adaptation Based on Mobility* patent application filed Mar. 15, 2010.

(Continued)

*Primary Examiner* — Mark Rinehart
*Assistant Examiner* — Matthew Hopkins
(74) *Attorney, Agent, or Firm* — Baker Botts L.L.P.

(57) ABSTRACT

A method comprising establishing a wireless link with at least one endpoint. The wireless link comprises at least one connection. The method also includes determining an application profile associated with a first connection of the wireless link. The method further includes dynamically selecting at least one parameter for the wireless link based on the detected application profile.

15 Claims, 5 Drawing Sheets

(56) References Cited

OTHER PUBLICATIONS

Helmut Bölcskei et al., Space-Frequency Coded Broadband OFDM Systems, Information Systems Laboratory, Stanford University (CA), *IEEE WCNC* 2000, Chicago (IL), Sep. 2000.

Gerard J. Foschini, Layered Space-Time Architecture fur Wireless Communication in a Fading Environment when Using Multi-Element Antennas, © 1996 Lucent Technologies Inc., *Bell Labs Technical Journal*, Autumn 1996.

Ersin Sengul et al., *Diversity Analysis of Single and Multiple Beamforming*, The Henry Samueli School of Engineering, University of California, Irvine (CA), May 2005.

Siavash M. Alamouti, A Simple Transmit Diversity Technique for Wireless Communications, *IEEE Journal on Select Areas in Communications*, vol. 16, No. 8, Oct. 1998.

Recommendation ITU-R M.1225, *Guidelines for Evaluation of Radio Transmission Technologies for IMT-2000* (Question ITU-R 398/8) 1997.

Report ITU-R M.2133, *Requirements, Evaluation, Criteria and Submission Templates for the Development of IMT-Advanced*, 2008.

Kyungkoo Jun, Packet QoS Aware AMC Selection for 3G LTE of Evolved Packet System, © 2008, *IEICE Trans. Commun.*, vol. E91-B, No. 8, Aug. 2008.

\* cited by examiner

METHOD AND SYSTEM FOR IMPLEMENTING LINK ADAPTATION BASED ON AN APPLICATION PROFILE

TECHNICAL FIELD

The present invention relates generally to wireless networks and more particularly to methods and systems for implementing link adaptation based on an application profile.

BACKGROUND

Cellular networks are undergoing a shift from being purely voice centric to a mixture of voice and data in third generation (3G) systems and beyond. The networks are also evolving into more packet based wireless broadband access networks (WBANs). The WBANs are designed to support voice, data, and multi-media applications. These applications have varying requirements for the delay budgets, packet loss error rates, and priority, sometimes referred to as the quality of service (QOS) requirements.

Multiple Input Multiple Output (MIMO) or multiple antenna technology is one of the technologies proposed to be used in fourth generation (4G) wireless systems. MIMO technology can improve the reliability of the underlying wireless channel or increase the spectral efficiency using different configurations. For example, spatial multiplexing (SM) can be used to increase spectral efficiency by transmitting multiple parallel streams of data from multiple antennas, while diversity techniques, such as Space Time Block Codes (STBC) or Space Frequency Block Codes (SFBC) can be used to increase the channel reliability by intelligent coding across space and time or frequency, respectively. Similarly various modulation and channel coding scheme (MCS) levels can be used to obtain a tradeoff between reliability and spectral efficiency.

Hybrid automatic repeat request (HARQ) is another technology used in 4G systems to obtain reliable transmissions. However, an increase in the number of re-transmissions by HARQ leads to larger delays.

SUMMARY

The teachings of the present disclosure relate to a method comprising establishing a wireless link with at least one endpoint. The wireless link comprises at least one connection. The method also includes determining an application profile associated with a first connection of the wireless link. The method further includes dynamically selecting at least one parameter for the wireless link based on the detected application profile.

Technical advantages of particular embodiments may include dynamically selecting a suitable combination of MIMO scheme and MCS level to be used with a wireless connection. Another technical advantage of particular embodiments is to adjust the selected combination of MIMO scheme and MCS level over the lifetime of the wireless link in response to changing conditions of the wireless link. Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
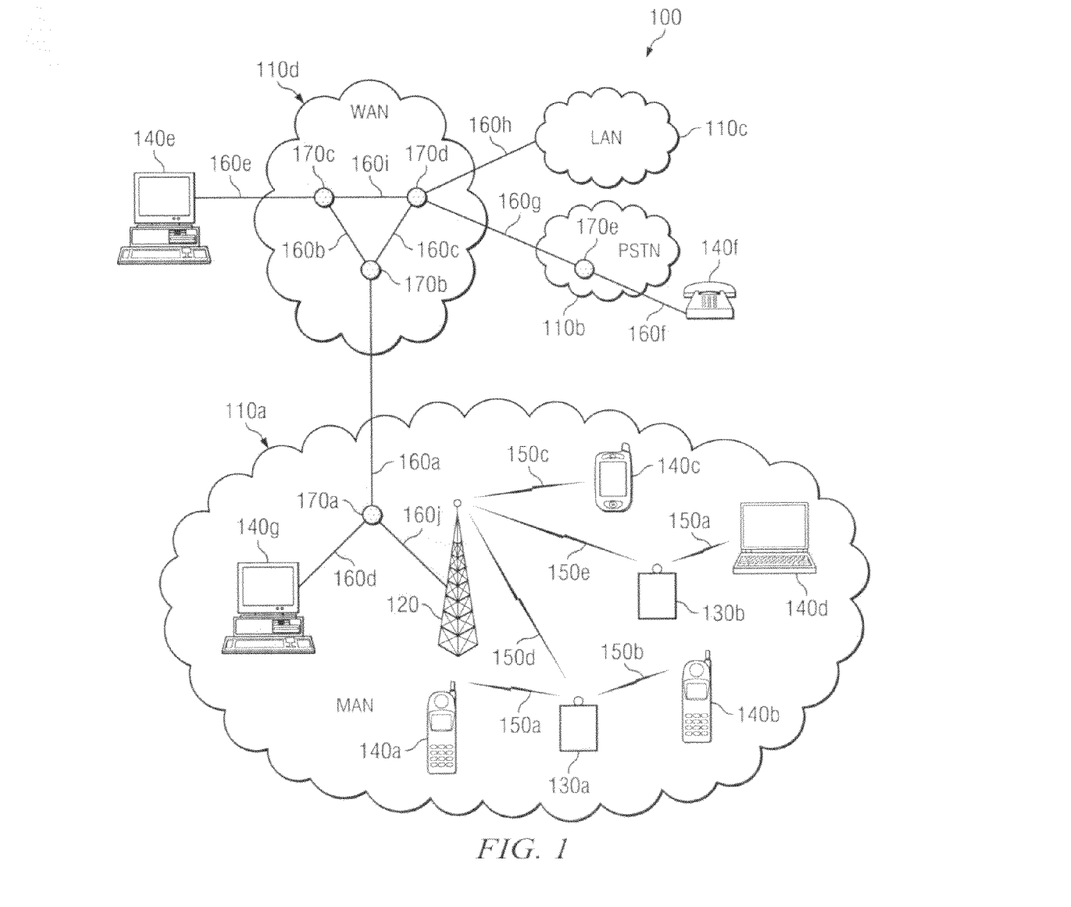
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110 utilizing any of a variety of communication protocols. Network 110a, which may be a wireless network in which one or more of the components of network 110a, such as base station 120, relay stations 130, and endpoints 140, may comprise multiple-input multiple-output (MIMO) technology. In particular embodiments, those components comprising MIMO technology may implement link adaptation based on an application profile and/or a mobility characteristic. Link adaptation may allow the MIMO scheme and MCS level to be selected for the link based on the information that is typically available at the endpoint and/or base station. For example, the information may include a link channel quality (e.g., signal to noise ratio), mobility information (e.g., speed), and/or application requirements (e.g., QoS). Depending on the embodiments, link adaptation may be used for the uplink, the downlink, or both.

In particular embodiments, based on the available information, an endpoint, such as endpoint 140a, may choose a suitable combination of MIMO scheme and MCS level to be used for the link. The choice may then be transmitted as a recommendation to a base station, such as base station 120 via a feedback control channel. In some embodiments, endpoint 140a may transmit the underlying information directly to base station 120 without making a recommendation. The information sent from endpoint 140a may aid base station 120 in making its own choice as to a suitable combination of MIMO scheme and MCS level.

Regardless of the technique used to make the decision, the decision may be crafted to satisfy the Quality of Service (QoS) requirements (e.g., delay and error tolerance) for the specific application being run by endpoint 140a, the relative mobility of endpoint 140a, or a combination of the application and mobility of endpoint 140a. Moreover, the decision may, in certain embodiments, also account for what is best for the network (e.g., what is the most efficient use of resources).

In some embodiments, base station 120 may consider additional information in making a decision for the configuration of a particular link. For example, base station 120 may distribute its transmission resources to satisfy the requirements of several different endpoints.

Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality that may be provided by a network. Networks 110 may provide their respective services using any of a variety of protocols for either wired or wireless communication. For example, network 110a may comprise any one of a variety of different wireless technologies such as 3G, 802.16 (popularly known as WiMAX), Long Term Evolution (LTE), LTE Advance (LTE-A), or any other wireless technology that supports the use of MIMO technology.

Although communication system 100 includes four different types of networks, networks 110a-110d, the term "network" should be interpreted as generally defining any network or combination of networks capable of transmitting analog or digital signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, LTE network, LTE-A network, global distributed network such as the Internet, Intranet, Extranet, or any other form of wireless or wired networking.

Networks 110 may be connected to each other and with other networks via a plurality of wired links 160, wireless links 150, and nodes 170. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d. For purposes of illustration and simplicity of explanation, network 110a is a MAN that may be implemented, at least in part, via a 4G networking standard, network 110b is a PSTN, network 110c is a LAN, and network 110d is a WAN.

In some embodiments, wireless links 150, of network 110a, may comprise an uplink and a downlink. The uplink and downlink may comprise numerous wireless connections (e.g., each application running on an endpoint may have its own connection via the wireless link). In particular embodiments, wireless links 150 may be using, for example, WiMAX or LTE-A. A wireless connection, or link, may comprise various wireless resources such as, for example, a combination of a particular center frequency, a particular bandwidth, a particular time slot, and/or a particular subchannel (for example, as described in a downlink or uplink MAP). In addition, external factors, such as distance, interference, mobility, and obstructions, may change the characteristics of a signal.

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, encoded software, or embedded logic implementing any number of communication protocols that allow for the exchange of packets in communication system 100. For example, node 170e may comprise a gateway. This may allow network 110b, a PSTN network, to be able to transmit and receive communications from other non-PSTN networks, such as network 110d, an IP network. As a gateway, node 170e may work to translate communications between the various protocols used by different networks.

Endpoints 140 may comprise any type of endpoint able to wirelessly send and receive data and/or signals to and from base station 120. Endpoints 140 may provide data or network services to a user through any combination of hardware, encoded software embedded in a computer readable medium, and/or encoded logic incorporated in hardware or otherwise stored (e.g., firmware). For example, endpoints 140a-140g may include an IP telephone, a computer, a laptop, a video monitor, a camera, a personal data assistant, a cell phone, a smart phone, or any other hardware, encoded software and/or encoded logic that supports the communication of packets (or frames) using networks 110. Endpoints 140 may also include unattended or automated systems, gateways, other intermediate components or other devices that can send or receive data and/or signals.

Within wireless network 110a, each of endpoints 140a-140d are connected to one of base station 120 or relay station 130. For simplicity, the component to which an endpoint is connected may generally be referred to as an access station. For example, the access station for endpoint 140a is relay station 130a.

Although FIG. 1 illustrates a particular number and configuration of endpoints, connections, links, and nodes, communication system 100 contemplates any number or arrangement of such components for communicating data. For example, communication system 100 may contain fewer or more networks 110. Furthermore, the interconnections between networks 110 may vary from those depicted in FIG. 1. In addition, elements of communication system 100 may include components centrally located (local) with respect to one another or distributed throughout communication system 100.

Figure 2:
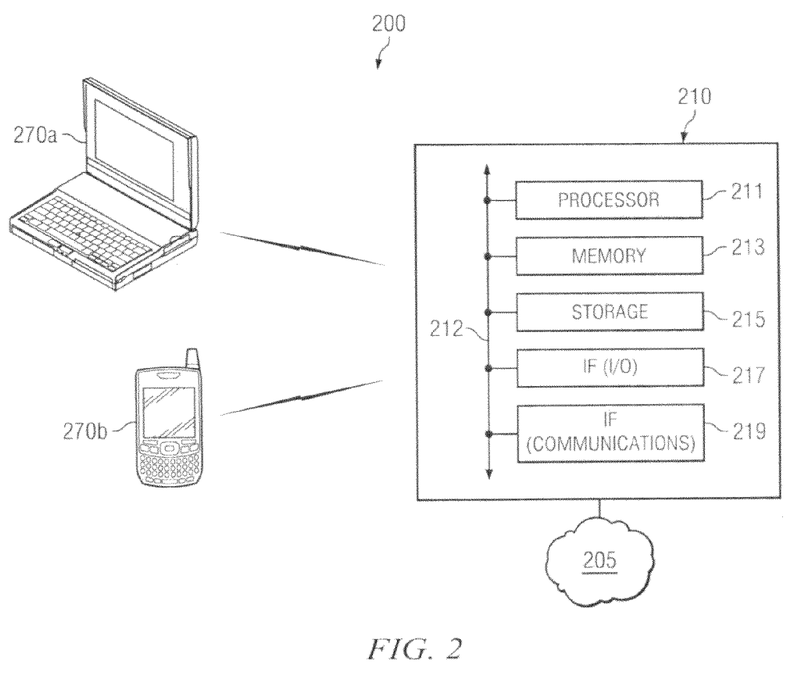
FIG. 2 illustrates a wireless network comprising a more detailed view of an access station, in accordance with a particular embodiment.

FIG. 2 illustrates a wireless network comprising a more detailed view of an access station, in accordance with a particular embodiment. More specifically, the depicted embodiment is a simplified scenario comprising network 205, access station 210, and endpoints 270. In different embodiments network 200 may comprise any number of wired or wireless networks, base station, relay stations, endpoints, and/or any other components that may facilitate or participate in the communication of data and/or signals whether via wired or wireless connections.

Each endpoint 270 and access station 210 may be thought of as separate computer systems. Depending on the scenario, configuration, and/or embodiment, endpoints 270 and/or access station 210 may include one or more portions of one or more computer systems. In particular embodiments, one or more of these computer systems may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provides functionality described or illustrated herein.

The components of endpoints 270 and/or access station 210 may take any suitable physical form and they may be arranged in any suitable fashion. For simplicity, only the components of access station 210 are discussed in detail. However, depending on the embodiment and configuration, endpoints 270 may comprise any suitable number, type and/or layout of the components discussed with respect to access station 210.

As example, and not by way of limitation, access station 210 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these.

Where appropriate, access station 210 may include one or more computer systems; be unitary or distributed; span multiple locations; span multiple machines; or reside in a cloud, which may include one or more cloud components in one or more networks. Where appropriate, access station 210 may perform without substantial spatial or temporal limitation one or more steps of one or more methods described or illustrated herein. As an example and not by way of limitation, access station 210 may perform in real time or in batch mode one or more steps of one or more methods described or illustrated herein. One or more access stations 210 (or endpoints 270) may perform at different times or at different locations one or more steps of one or more methods described or illustrated herein, where appropriate.

In particular embodiments, access station 210 includes processor 211, memory 213, storage 215, input/output (I/O) interface 217, communication interface 219, and bus 212. These components may work together in order to provide wireless networking functionality, such as providing dynamic link adaptation based on an application profile and mobility characteristic associated with a wireless link. Although a particular access station is depicted having a particular number of particular components in a particular arrangement, this disclosure contemplates any suitable access station 210 (or endpoint 270) having any suitable number of any suitable components in any suitable arrangement.

In particular embodiments, processor 211 includes hardware for executing instructions, such as those making up a computer program. As an example and not by way of limitation, to execute instructions, processor 211 may retrieve (or fetch) the instructions from an internal register, an internal cache, memory 213, or storage 215; decode and execute them; and then write one or more results to an internal register, an internal cache, memory 213, or storage 215. In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215, and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211 or for writing to memory 213 or storage 215; or other suitable data. The data caches may speed up read or write operations by processor 211. The TLBs may speed up virtual-address translation for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

In particular embodiments, memory 213 may include main memory for storing instructions for processor 211 to execute or data for processor 211 to operate on. As an example and not by way of limitation, access station 210 may load instructions from storage 215 or another source (such as, for example, another computer system, another access station, or an endpoint) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere). One or more memory buses (which may each include an address bus and a data bus) may couple processor 211 to memory 213. Bus 212 may include one or more memory buses, as described below. In particular embodiments, one or more memory management units (MMUs) may reside between processor 211 and memory 213 and facilitate accesses to memory 213 requested by processor 211. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate.

In particular embodiments, storage 215 may include mass storage for data or instructions. As an example and not by way of limitation, storage 215 may include an HDD, a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to access station 210, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Mass storage 215 may take any suitable physical form and may comprise any suitable number or type of storage. Storage 215 may include one or more storage control units facilitating communication between processor 211 and storage 215, where appropriate.

In particular embodiments, I/O interface 217 may include hardware, encoded software, or both providing one or more interfaces for communication between access station 210 and one or more I/O devices. Access station 210 may include one or more of these I/O devices, where appropriate. One or more of these I/O devices may enable communication between a person and access station 210. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of I/O interfaces 217 for them. Where appropriate, I/O interface 217 may include one or more device or encoded software drivers enabling processor 211 to drive one or more of these I/O devices. I/O interface 217 may include one or more I/O interfaces 217, where appropriate.

In particular embodiments, communication interface 219 may include hardware, encoded software, or both providing one or more interfaces for communication (such as, for example, packet-based communication) between access station 210 and one or more other access stations, endpoints, networks. As an example and not by way of limitation, communication interface 219 may include a network interface controller (NIC) or network adapter for communicating with an Ethernet or other wire-based network or a wireless NIC (WNIC) or wireless adapter for communicating with a wireless network, such as a 3G, 4G, WiMAX, LTE, LTE-A, or WI-FI network. In some embodiments, communication interface 219 may include multiple antennas used, for example, in conjunction with MIMO technology. Depending on the embodiment, access station 210 may be used in any suitable network and may comprise any suitable communication interface 219 for it. As an example and not by way of limitation, access station 210 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, access station 210 may communicate with a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Base station 210 may include any suitable communication interface 219 for any of these networks, where appropriate. Communication interface 219 may include one or more communication interfaces 219, where appropriate.

In particular embodiments, bus 212 may include hardware, encoded software, or both coupling components of access station 210 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 may include any number, type, and/or configuration of buses 212, where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Network 205 may comprise one or more interconnected networks operated by one or more different operators, using one or more different technologies or protocols. Though network 205 is depicted as a single network, it may comprise any number of the networks described above with respect to FIG. 1. For example, network 205 may comprise the Internet, a LAN, WAN, MAN, PSTN or some combination of the above.

The components and devices illustrated in FIG. 2 may be used to provide link adaptation. Link Adaptation may be used with modern 3G and 4G wireless systems (e.g., WiMAX, LTE, LTE-A, etc.). In particular embodiments, link adaptation may provide adjustments to the modulation and coding scheme (MCS) level used by communication interface 219 for the uplink and/or downlink of a wireless link based on a combination of at least two or more factors including channel quality information for a wireless link, an application profile for one or more programs over the wireless link, and a mobility indication of the endpoint (e.g., endpoint 270a) with which the wireless link is established. For example, when a wireless link is in a poor state (e.g., a low signal to noise ratio (SNR)) a lower MCS level may be used to increase the reliability of transmissions despite its spectral in-efficiency. Conversely, for example, when a wireless link is in a good state (e.g., a high SNR) a higher MCS level may be used to obtain higher spectral efficiency.

Each MCS level may be associated with an SNR threshold below which it has an unacceptably high bit error rate (BER). Particular embodiments may select the highest MCS level whose SNR threshold is smaller than the current SNR of the wireless link while also taking into account at least one of an application profile or a mobility indication of at least one connection of the wireless link.

In addition to selecting an appropriate MCS level, particular embodiments may also select a MIMO scheme suitable for a particular wireless link. Available MIMO schemes may include, for example, spatial multiplexing (SM) or a transmit diversity technology such as Space Time Block Codes (STBC) or Space Frequency Block Codes (SFBC). SM may provide higher spectral efficiency while STBC/SFBC may provide higher reliability.

Depending on the scenario, the mobility of endpoints 270 may cause abnormal fluctuations in the wireless link, for example, in the channel quality (as compared to a stationary endpoint). These fluctuations may impact the data throughput of the wireless link. Accordingly, the mobility of endpoints 270 may impact the type of MIMO scheme and/or the MCS level that is used for a particular SNR. As the endpoint increases speed the need for reliability may also increase. Accordingly, particular embodiments, may select more robust link parameters for an endpoint that is moving than would be selected if SNR considerations alone were considered. For example, a quicker moving endpoint may switch from SM to STBC/SFBC at a lower SNR. This may be because the STBC/SFBC scheme is more reliable than the SM scheme. While a traditional base station may use the average SNR to select an MCS level without regard to mobility, particular embodiments, by including the mobility of endpoints 270, may make selections that more accurately reflect the quality of the wireless link.

Different types of applications have different QoS requirements. The QoS requirements may include such factors as delay and packet loss rate. Some protocols or technologies have techniques (e.g., HARQ) that correct or respond to packet errors. These techniques may add delay in responding to a bad packet. Thus, when the channel is bad, particular embodiments, may use a more reliable MCS/MIMO combination that reduces the number of re-transmissions for bad packets. This may result in less packet delay. Conversely, when the channel quality is good, particular embodiments may take advantage of an MCS/MIMO combination that provides high spectral efficiency. The higher efficiency may be used because it may be less likely that packets will have to be re-transmitted. Particular embodiments may consider the trade-offs between higher reliability and higher efficiency in light of the QoS requirements for the specific application using the wireless link. For example, an application, used with conversational voice may be able to tolerate a relatively high packet loss rate (e.g., $10^{-2}$) but may have a relatively strict delay requirement (e.g., 100 ms). As another example, a file sharing application may require a relatively low packet error rate (e.g., $10^{-6}$) but may tolerate a relatively long delay (e.g., 300 ms). Between these two extreme cases there are other applications with their respective delay tolerance and loss error rate requirements. The QoS requirements may be stored in memory 213, storage 215 or remotely.

Another characteristic of different applications may be the statistical distributions of their respective sources. For example, the media access control packet data unit (MAC PDU) size for a VoIP application is relatively small (e.g., 42 bytes) compared to the mean MAC PDU size of an I-frame of a streaming movie (e.g., 5640 bytes). Larger MAC PDUs may be more susceptible to errors. Particular embodiments may segment data that is to be transmitted into smaller blocks. The size of these smaller blocks may be determined based the SNR, application profile, and/or mobility of the endpoint.

In particular embodiments, processor 211 of base station 210 (or a processor of endpoint 270b) may select between the various MIMO schemes and MCS levels to provide a suitable balance between reliability and efficiency based on a combination of the SNR, the application profile of an application using the wireless link, and the mobility of the respective endpoint 270. This may allow for application and mobility aware link adaptation. In considering the application profile and mobility associated with a wireless link, base station 210 may be moving traditional adaptation from a physical layer decision into a cross-layer decision. This may allow link adaptation decisions that better meet the application's requirements (e.g., QoS requirements), given the mobility characteristics and channel conditions.

Information regarding the SNR, application profile, and/or mobility may be determined, detected, or communicated in a variety of ways. For example, in some embodiments, and in some scenarios, endpoint 270a may send a 4-bit call quality indication (CQI) index to recommend a particular MCS level and precoding matrix indicator (PMI) to indicate the precoding matrix to be used in a spatial multiplexing MIMO scheme. In certain embodiments, and in certain situations, endpoint 270b may send a 2-bit MIMO scheme recommendation (e.g., SM, STBC/SFBC, or other MIMO scheme) in addition to the CQI.

In addition to the 4-bit CQI and the 2-bit MIMO scheme, some embodiments may comprise a 2-bit mobility indication to provide feedback as to the mobility of the endpoint. In some embodiments, base station 210 may be able to determine the mobility of endpoints 270 on its own (e.g., without receiving a mobility indication). In particular embodiments, the mobility indication may quantize the mobility of an endpoint into four classes: (1) indoor (<10 kmph), (2) microcellular (10 to 30 kmph), (3) base coverage urban (30 to 120 kmph) and (4) high speed (120 to 350 kmph).

In particular embodiments, endpoints 270 may use a control channel to communicate a recommendation (e.g., a particular MCS/MIMO scheme) to base station 210. This may be done once endpoint 270a, for example, determines a suitable MCS/MIMO combination based on one or more of the application profile, SNR, and mobility information. Because endpoint 270a is supplying the information for its own wireless link, it knows the SNR, as opposed to a base station which may estimate SNR information using, for example, endpoint sounding signals. Moreover, because endpoint 270a has taken into account its mobility in making its recommendation, there may be no need for endpoint 270a to provide mobility feedback. This approach may shift the processing load from base station 210 to endpoints 270.

Thus far, several different embodiments and features have been presented. Particular embodiments may combine one or more of these features depending on operational needs and/or component limitations. This may allow for great adaptability of network 200 to the needs of various organizations and users. For example, a particular embodiment may use several access stations to provide wireless access for a metropolitan area. Some embodiments may include additional features.

Figure 3A:
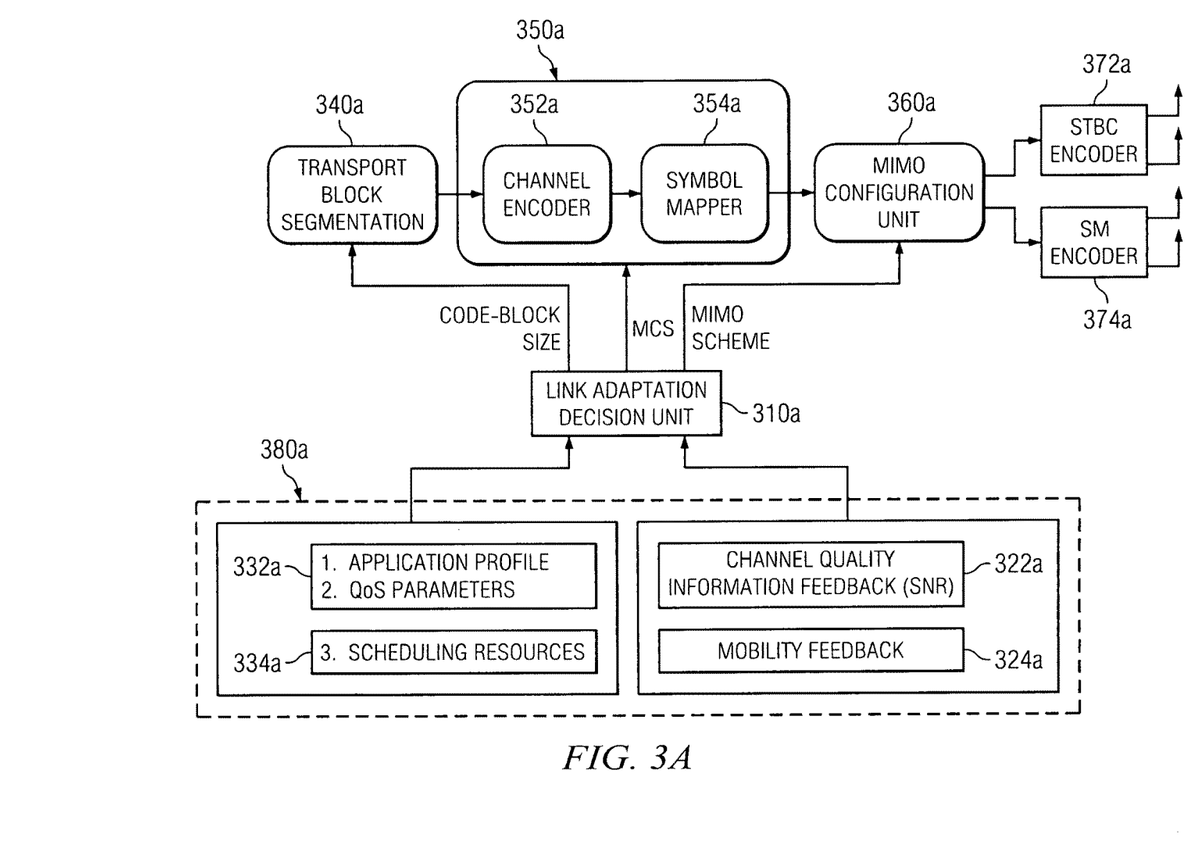
FIG. 3A depicts a block diagram illustrating a link adaptation decision made at a base station, in accordance with a particular embodiment.
Figure 3B:
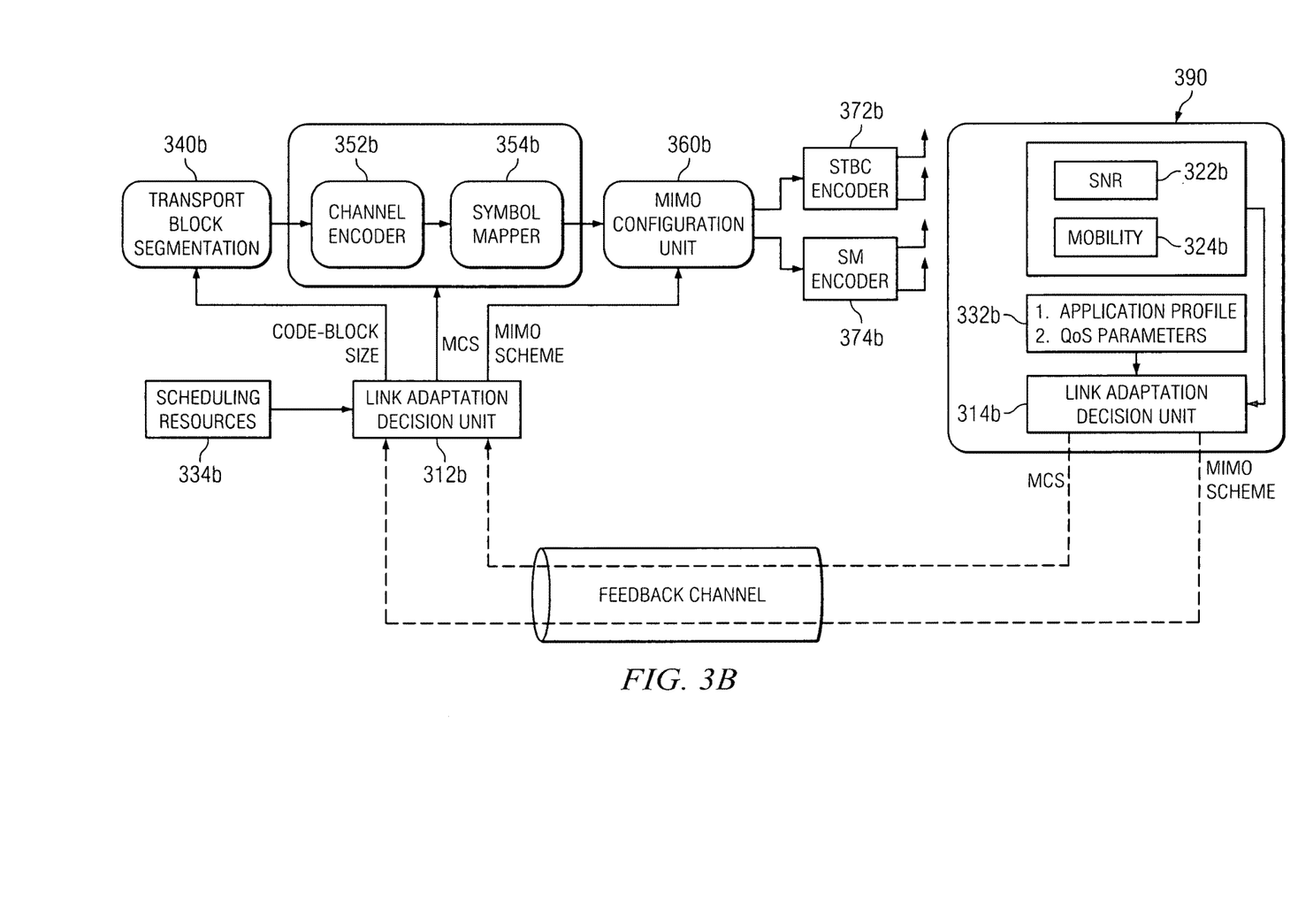
FIG. 3B depicts a block diagram illustrating a link adaptation decision made at an endpoint, in accordance with a particular embodiment.

FIGS. 3A and 3B generally illustrate the flow of information before and after link adaptation decisions are made. In particular, FIG. 3A depicts a block diagram illustrating a link adaptation decision made at a base station, in accordance with a particular embodiment; and FIG. 3B depicts a block diagram illustrating a link adaptation decision made at an endpoint, in accordance with a particular embodiment.

With respect to FIG. 3A, link adaptation unit 310a is part of a base station, such as base station 210 discussed above. Link adaptation unit 310 receives CQI information 322a and mobility information 324a. This information may be received from an endpoint, such as endpoint 270b, it may be determined locally at the base station, or it may be gathered through a combination of the two. Link adaptation unit 310 may also receive application profile information 332a and scheduling resources information 334a. This information may be readily available from the base station. Collectively, CQI information 322a, mobility information 324a, application profile information 332a and scheduling resources information 334a may be referred to as input information 380a.

Using input information 380a, link adaptation unit 310a may output the code-block size (provided to segmentation block 340a), MCS level (provided to channel encoder 352a and symbol mapper 354a), and MIMO scheme (provided to MIMO scheme unit 360a). As alluded to above, depending on the embodiment and capabilities of the base station and endpoint, the base station may receive mobility information 324a from an endpoint or it may determine the endpoint's mobility from analyzing the Doppler spectrum of the reference signals sent by the endpoint. Similarly, channel quality information 322a may be received as a CQI index value provided by an endpoint or the base station may estimate the link quality (e.g., based on the uplink quality and reciprocity or endpoint sounding).

With respect to FIG. 3B, there are two link adaptation units, link adaptation unit 312b is part of a base station, such as base station 210, and link adaptation unit 314b is a part of an endpoint, such as endpoint 270b. Link adaptation unit 314b at the endpoint may determine the MCS level and MIMO scheme based on application profile 332b, SNR information 322b, and mobility information 324b. The MCS and MIMO decision made by link adaptation unit 314b may be sent to the base station as a recommendation to link adaptation unit 312b at the base station. Link adaptation unit 312b may then use this information along with scheduling resources information 334b to make a final decision on the code-block size, MCS, and MIMO scheme.

Application profile information 332 may include estimated delay and throughput curves of the particular application as a function of the SNR. This information may be pre-determined and stored locally at either the base station or the endpoint, where appropriate.

Regardless of whether the link adaptation functionality is solely within the base station (FIG. 3A) or is divided between the endpoint and the base station (FIG. 3B), the decision process involving the application profile may, in certain embodiments, be divided into two stages. In the first stage, the choice of MCS/MIMO may be limited to the set of combinations that satisfy target delay and packet error loss rate requirements (e.g., as ascertained from the application profile). In the second stage, the MIMO/MCS scheme that maximizes the throughput among the subset of combinations output by the first stage may be chosen.

Generally speaking, the motion of objects causes Doppler spectrum which gives the statistical distribution of the channel at a particular frequency. The Doppler spectrum is non-zero for $(f-f_D, f+f_D)$, where $f_D$ is the maximum Doppler spread which is calculated as follows:

$$f_D = \frac{f_c v}{c} \cos\theta_m$$

where v is the speed of the object and c is the speed of light, $f_c$ is the frequency of operation, and $\theta_m$ is the relative angle between the objects in motion.

Regardless of whether the link adaptation functionality is solely within the base station (FIG. 3A) or is divided between the endpoint and the base station (FIG. 3B), the decision process involving the mobility of the endpoint may, in certain embodiments, be divided into two stages. In the first stage, the mobility of the endpoint may be taken into account to generate a sub-set of performance curves. The sub-set of curves may then be used in the next stage to maximize the throughput and/or minimize the delay.

Figure 4:
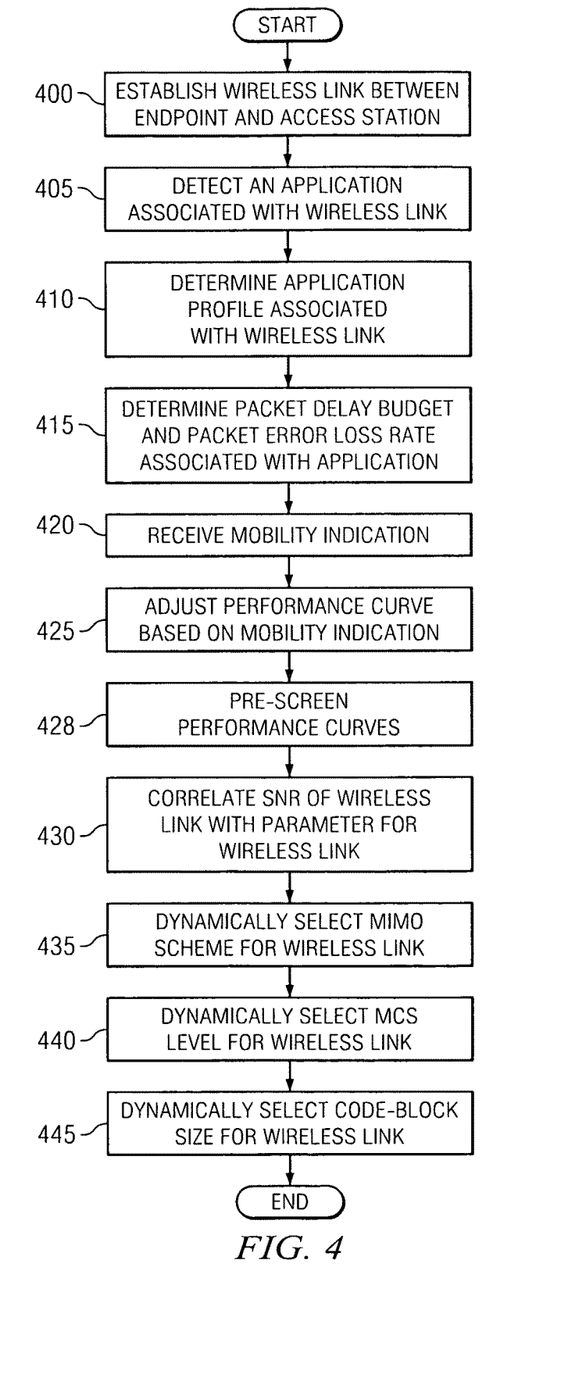
FIG. 4 illustrates a method for implementing link adaptation based on an application profile and mobility, in accordance with a particular embodiment.

FIG. 4 illustrates a method for implementing link adaptation based on an application profile and endpoint mobility, in accordance with a particular embodiment. Particular embodiments may configure link layer parameters to satisfy application layer QoS requirements (e.g., delay and error tolerance) in light of channel conditions (e.g., SNR and/or mobility). The depicted method may be applicable to a wide range of next generation communication systems (e.g., LTE-A and WiMAX) that support different MIMO and/or MCS schemes.

The method begins at step 400 with the establishment of a wireless link between at least one endpoint and an access station. The wireless link may comprise multiple connections. For example, in some embodiments an endpoint may establish a wireless link with an access station, and then use the wireless link to support multiple connections associated with multiple applications (e.g., one connection for a VoIP session, another connection for a data transfer session, etc.). The link may be established using any of a variety of wireless technologies and/or protocols. For example, the wireless connection may be a 3G, 4G, WiMAX, LTE, or LTE-A wireless connection.

At step 405 an application associated with one of the connections associated with the wireless link is detected. The application may be detected by either the base station or the endpoint. For example, the endpoint may be able to detect the application based on what applications the endpoint is running. As another example, the base station may be able to detect the application based on the signaling exchanged during the establishment of the connection for the application.

At step 410 an application profile associated with the connection associated with the wireless link is determined. This may be done at the endpoint or base station with locally or remotely stored information. In particular embodiments, the application profile may be based on the application or application type detected at step 405. For example, if the endpoint is running a specific VoIP application, step 410 may entail determining that the endpoint is running a conversational voice type application.

At step 415 a packet delay budget and a packet error loss rate associated with the application are determined (by the endpoint or the base station). In some embodiments, the packet delay budget and packet error loss rate may be determined from a table that lists the packet delay budget and the packet error loss rate associated with several different types of applications. For example, the LTE specification includes a table comprising nine different types of application profiles.

At step 420 a mobility indication indicative of a rate of travel of the endpoint is received. Depending on the embodiment and/or scenario, the mobility indication may be received from the endpoint or it may be calculated by the base station. For example, in particular embodiments, the mobility indication for an endpoint may be by a base station using sounding signals provided by the endpoint. In some embodiments, the endpoint may communicate its knowledge of its mobility. Depending on the embodiment, the mobility indication may comprise a selection of a particular class of speeds.

At step 425 at least one performance curve is adjusted based on the mobility indication. The at least one performance curve correlates at least one parameter of a wireless link with a detected SNR. This adjustment may account for the degradation of the wireless connection that may occur the faster the endpoint travels. The performance curves may correlate block error rate versus SNR and delay versus SNR. The curves may originally be constructed to cover a variety of different scenarios based on a given mobility, MIMO scheme, code block size, and MCS, (using, for example, a link level simulator or actual measurements). Depending on the scenario, the performance curves may be based on a set of link-level simulations or real system measurements.

At step 428 the performance curves are pre-screened based on, for example, the application profile. The pre-screening may eliminate those performance curves that may not meet the QoS requirements of the application profile. This may reduce the number of performance curves that are considered in later steps.

At step 430 a signal to noise ratio associated with the wireless link is correlated with the at least one parameter for the wireless link. In particular embodiments, the SNR information for a wireless link may be estimated (e.g., based on reciprocity) at the base station using sounding signals periodically transmitted by an endpoint. In certain embodiments, the SNR information may be communicated or reported specifically from the endpoint. Regardless of how the SNR is acquired, the correlation may be based on the adjusted performance curve attained at step 425. The correlation at step 430 may help in eliminating from consideration those MCS levels and/or MIMO schemes that may not meet the QOS requirements based on the detected SNR. In some embodiments, a table may be constructed identifying the minimum SNR requirement above which a corresponding configuration of code block size, MIMO scheme, and MCS levels may be applied that provides, based on the performance curves for a given application, a specified delay and packet error rate requirement under each mobility scenario.

At steps 435, 440, and 445 the MIMO scheme, the MCS level, and the code-block size are dynamically selected for the wireless link. Depending on the embodiment and/or scenario, the determinations may be made at the base station, the endpoint, or a combination of the two. Where one or more of the selections are made at the endpoint, the endpoint may transmit the selections to the base station as a recommendation. Regardless of where the selections are made, each selection may be based on one or more of the application profile, endpoint mobility, or SNR. Not only may the selections account for the QOS requirements for the wireless link or connection in light of the channel quality and endpoint mobility, but they may also attempt to maximize the efficiency and/or total throughput of the access station across all its wireless links. These selections may be dynamically adjusted over the course of the life of the wireless link. This may allow for adaptability to changing conditions.

Some of the steps illustrated in FIG. 4 may be combined, modified or deleted where appropriate, and additional steps may also be added to the flowchart. For example, in some embodiments, more than one data stream may be decoded using the maximum likelihood decoder. Additionally, steps may be performed in any suitable order without departing from the scope of particular embodiments.

Although particular embodiments have been described in detail, it should be understood that they do not limit the scope of this disclosure and that various other changes, substitutions, combinations and alterations may be made hereto without departing from the spirit and scope of the disclosure. For example, although an embodiment has been described with reference to a number of elements included within communication system 100 such as endpoints and base stations, these elements may be combined, rearranged or positioned in order to accommodate particular routing architectures or needs. In addition, any of these elements may be provided as separate external components to communication system 100 or each other where appropriate. The present invention contemplates great flexibility in the arrangement of these elements as well as their internal components.

Numerous other changes, substitutions, variations, alterations and modifications may be ascertained by those skilled in the art and it is intended that various embodiments encompass all such changes, substitutions, variations, alterations and modifications as falling within the spirit and scope of the appended claims.

What is claimed:

1. A method comprising:
    establishing a wireless link with at least one endpoint, the wireless link comprising at least one connection;
    determining an application profile associated with a first connection of the wireless link;
    receiving a mobility indication indicative of a rate of travel of the endpoint;
    adjusting, based on the mobility indication, a performance curve associated with the wireless link;
    receiving a signal to noise ratio associated with the wireless link; and
    dynamically configuring at least one parameter of the wireless link based on the detected application profile, the performance curve, the signal to noise ratio, and the mobility indication.

2. The method of claim 1, wherein configuring the at least one parameter of the wireless link comprises configuring a parameter from the group consisting of a multiple input multiple output (MIMO) scheme for the wireless link, a modulation and coding scheme (MCS) level for the wireless link, and a code-block size for segmenting frames sent via the wireless link.

3. The method of claim 1, wherein dynamically configuring at least one parameter comprises adjusting the configuration during a lifetime of the wireless link.

4. The method of claim 1, wherein determining an application profile associated with the wireless link comprises:
    detecting an application associated with the wireless link; and
    determining a packet delay budget and a packet error loss rate associated with the application.

5. The method of claim 1, wherein dynamically configuring at least one parameter of the wireless link comprises correlating a signal to noise ratio associated with the wireless link with the at least one parameter of the wireless link.

6. An apparatus comprising:
    an interface configured to:
        establish a wireless link with at least one endpoint, the wireless link comprising at least one connection;

receive a mobility indication indicative of a rate of travel of the endpoint; and receive a signal to noise ratio associated with the wireless link; and a processor coupled to the interface and configured to:
determine an application profile associated with a first connection of the wireless link; and
dynamically configure at least one parameter of the wireless link based on the detected application profile, the performance curve, the signal to noise ratio, and the mobility indication.

7. The apparatus of claim 6, wherein the processor configured to configure the at least one parameter of the wireless link is further configured to configure a parameter from the group consisting of a multiple input multiple output (MIMO) scheme for the wireless link, a modulation and coding scheme (MCS) level for the wireless link, and a code-block size for segmenting frames sent via the wireless link.

8. The apparatus of claim 6, wherein the processor configured to dynamically configure at least one parameter comprises a processor configured to adjust the configuration during a lifetime of the wireless link.

9. The apparatus of claim 6, wherein the processor configured to determine an application profile associated with the wireless link is further configured to:
detect an application associated with the wireless link; and
determine a packet delay budget and a packet error loss rate associated with the application.

10. The apparatus of claim 6, wherein the processor configured to dynamically configure at least one parameter of the wireless link comprises a processor configured to correlate a signal to noise ratio associated with the wireless link with the at least one parameter of the wireless link.

11. A non-transitory computer readable storage medium comprising executable instructions that when executed by a processor are configured to:
establish a wireless link with at least one endpoint, the wireless link comprising at least one connection;
determine an application profile associated with a first connection of the wireless link;
receive a mobility indication indicative of a rate of travel of the endpoint;
adjust, based on the mobility indication, a performance curve associated with the wireless link;
receive a signal to noise ratio associated with the wireless link; and
dynamically configure at least one parameter of the wireless link based on the detected application profile, the performance curve, the signal to noise ratio, and the mobility indication.

12. The medium of claim 11, wherein the instructions configured to configure the at least one parameter of the wireless link comprise instructions configured to configure a parameter from the group consisting of a multiple input multiple output (MIMO) scheme for the wireless link, a modulation and coding scheme (MCS) level for the wireless link, and a code-block size for segmenting frames sent via the wireless link.

13. The medium of claim 11, wherein the instructions configured to dynamically configure at least one parameter comprises instructions configured to adjust the configuration during a lifetime of the wireless link.

14. The medium of claim 11, wherein the instructions configured to determine an application profile associated with the wireless link comprise instructions configured to:
detect an application associated with the wireless link; and
determine a packet delay budget and a packet error loss rate associated with the application.

15. The medium of claim 11, wherein instructions configured to dynamically configure at least one parameter of the wireless link comprise instructions configured to correlate a signal to noise ratio associated with the wireless link with the at least one parameter of the wireless link.

* * * * *